United States Patent
Maruyama

[19]

[11] Patent Number: 5,898,907
[45] Date of Patent: Apr. 27, 1999

[54] RADIO TRANSMITTER-RECEIVER ADOPTING BOTH A SINGLE FREQUENCY AND A DOUBLE FREQUENCY CONVERSION

[75] Inventor: Hidenori Maruyama, Tokyo, Japan

[73] Assignee: NEC Corporation, Japan

[21] Appl. No.: 08/796,530

[22] Filed: Feb. 6, 1997

[30] Foreign Application Priority Data

Feb. 9, 1996 [JP] Japan ..................................... 8-023778

[51] Int. Cl.$^6$ ..................................................... H04B 1/40
[52] U.S. Cl. ................................ 455/76; 455/86; 455/265
[58] Field of Search .................................. 455/75, 76, 82, 455/83, 84, 86, 105, 106, 112, 113, 117, 118, 119, 182.1, 182.2, 183.1, 190.1, 192.2, 255, 257, 258, 259, 260, 265, 314, 315

[56] References Cited

U.S. PATENT DOCUMENTS

| | | | |
|---|---|---|---|
| 5,276,913 | 1/1994 | Lee et al. | 455/76 |
| 5,603,097 | 2/1997 | Kanou | 455/76 |

FOREIGN PATENT DOCUMENTS

| | | |
|---|---|---|
| 58-178746 | 11/1983 | Japan . |
| 63-9320 | 1/1988 | Japan . |
| 4-240924 | 8/1992 | Japan . |
| 4-257126 | 9/1992 | Japan . |
| 4-281636 | 10/1992 | Japan . |
| 4-348620 | 12/1992 | Japan . |
| 6-152467 | 5/1994 | Japan . |
| 7-22981 | 1/1995 | Japan . |

Primary Examiner—Reinhard J. Eisenzopf
Assistant Examiner—Sam Bhattacharya
Attorney, Agent, or Firm—Ostrolenk, Faber, Gerb & Soffen, LLP

[57] ABSTRACT

In a radio transmitter-receiver, a single frequency conversion method is used at a side of transmission and a double frequency conversion method is used at a side of reception. The frequency for transmission is identical with that of reception. A common oscillator of an oscillation frequency f1 is used for a local frequency for transmission/reception-first frequency conversion. A reception second local frequency signal and a transmitter intermediate frequency signal are generated by independent oscillators with oscillation frequencies 2f2 and 2f3 respectively. These oscillators generate two times the frequency of the conventional example thereof, thus providing the signals with frequency of ½ times the frequency-division by the frequency dividers for the reception side second frequency converter and transmission side intermediate frequency converters respectively. The output signals of these two oscillators are mixed in the frequency converter before the output signals are divided into ½-times the frequency thereof by the frequency divider, thus generating a base band signal of [2f2+2f3]/2 (in which "+" means mixing of signals) with the same frequency as that of the second local frequency signal. In this constitution, during reception of the signals, it allows the operation of the frequency divider for a transmitter intermediate frequency signal to halt temporarily. For this reason, since interference to the intermediate frequency band at the reception side vanishes therefrom, it becomes unnecessary to shield the reception side and the transmission side from each other.

19 Claims, 5 Drawing Sheets

F I G. 3
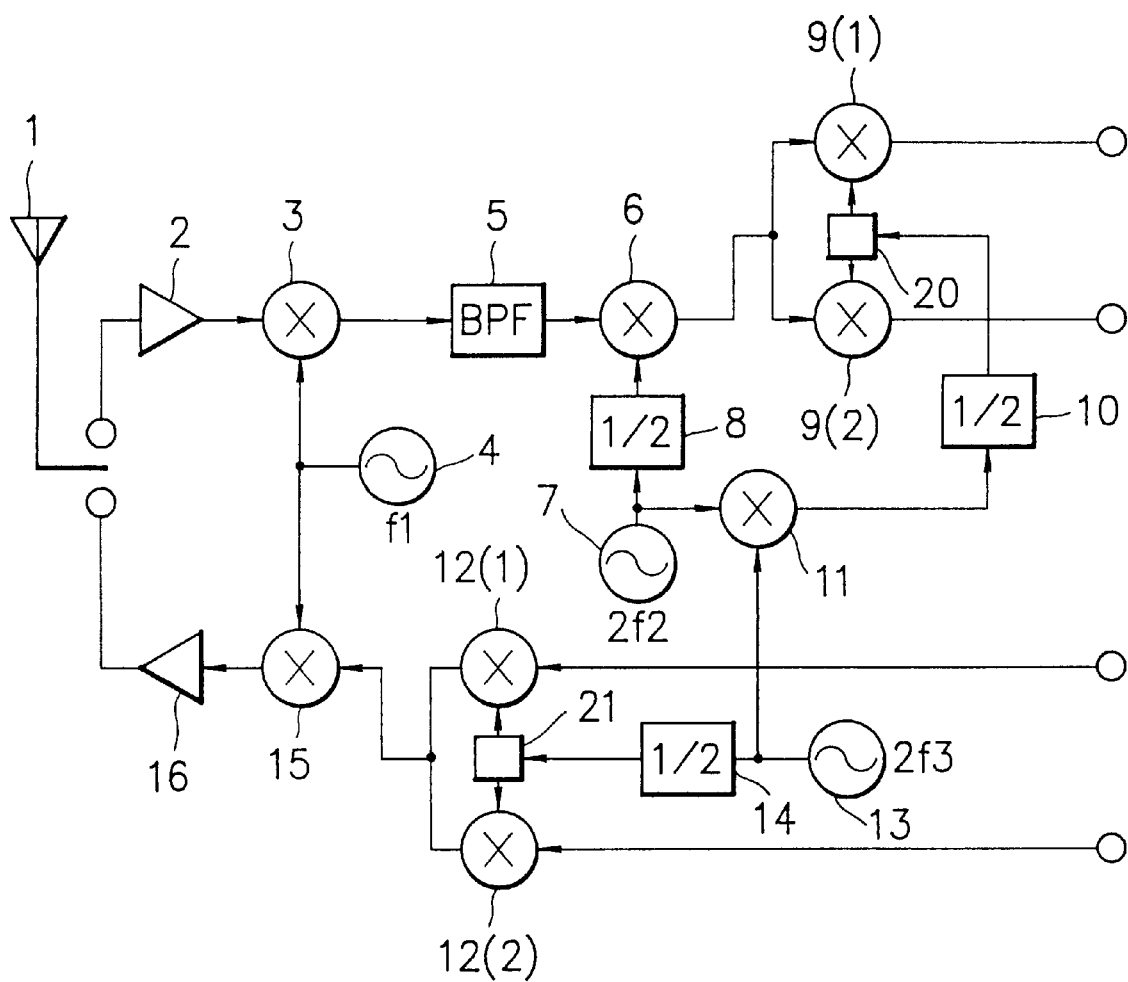

F I G. 5

| | FIRST CONVERSION | RECEPTION SECOND LOCAL FREQUENCY | TRANSMITTER INTERMEDIATE FREQUENCY SIGNAL | BASE BAND SIGNAL |
|---|---|---|---|---|
| PRIOR ART | f1 | f2 | f3 | f4 |
| PRESENT INVENTION | f1 | 2f2 | 2f3 | [2f2+2f3]/2 |

RADIO TRANSMITTER-RECEIVER ADOPTING BOTH A SINGLE FREQUENCY AND A DOUBLE FREQUENCY CONVERSION

BACKGROUND OF THE INVENTION

The present invention relates to frequency-plan of radio data transmission, and in particular to frequency-plan of a transmitter-receiver for a double superheterodyne scheme.

DESCRIPTION OF THE PRIOR ART

In radio data transmission systems, it is difficult to increase gain by only radio-frequency amplification of the single superheterodyne scheme. For this reason, particularly for radio equipment for the radio-frequency band, the double superheterodyne scheme, which increases gain with two steps, is often employed.

FIG. 1 shows a conventional example of radio transmitter-receiver of the double superheterodyne scheme.

The conventional radio transmitter-receiver comprises an antenna 31 for transmitting/receiving a radio wave, an amplifier 32 for amplifying signals received by the antenna 31, a first frequency converter 33 for converting the above amplified signals into first intermediate frequency signals, a first local oscillator 34 whose signal is inputted both to the first frequency converter 33 and to a transmission-first frequency converter 312, a band pass filter 35 for passing through only a necessary bandwidth-component of an output of the first frequency converter, a second frequency converter 36 for converting the output of the first frequency converter 33 into a second intermediate frequency signal, a second local oscillator 37 for outputting a second local oscillation signal which is inputted to the second frequency converter 36, third frequency converters 38(1) and 38(2) for converting the signals of the second frequency converter 36 into a reception-demodulated reference signal, a third local oscillator 39 for creating a third local oscillation signal which is inputted to the third frequency converter 38, transmission-second frequency converters 310(1) and 310(2) for converting a base band signal to be transmitted into a transmission-intermediate frequency signal, a transmission-second local oscillator 311 whose signal inputted to the transmission-second frequency converter 310, a transmission-first frequency converter 312, and an amplifier 313 allowing signals outputted from the transmission-first frequency converter 312 to amplify to a level at which the signal is converted into a radio wave by the antenna 31 to be outputted. In FIG. 1, a local frequency for transmitting/receiving-first frequency conversion is f1, a reception-second local frequency is f2, a transmission-intermediate frequency signal is f3, and a base band signal is f4.

Furthermore, Japanese Patent Application Laid-Open No. SHO 63-9320 discloses "Double Superheterodyne Receiver", which is the another conventional example. The example of structure thereof is shown in FIG. 2.

The conventional double superheterodyne receiver of FIG. 2 comprises an antenna 41 for receiving a radio wave, a radio-frequency amplifier 42 for amplifying the signal received by the antenna 41, a first frequency converter 43 for converting the signal into a intermediate frequency signal, an oscillator 44 whose signal is inputted into the first frequency converter 43, a multiple section 45 for causing the signal from the oscillator 44 to multiply up to a determined value, a buffer 46 for buffering the signal of the oscillator 44, a first intermediate amplifier 47 for amplifying signals obtained by the first frequency converter 43, a second frequency converter 48 for converting the signal obtained by the first intermediate amplifier 47 into a second intermediate frequency signal, a second intermediate amplifier 410 for amplifying the signal obtained by the second frequency converter 48, and a wave detector 411 for picking up only necessary signals.

The conventional double superheterodyne receiver according to the Japanese Patent Application Laid-Open No. SHO 63-9320 allows single-frequency signals outputted from one oscillator to divide at two signals. A multiplier performs the frequency conversion on one signal thereof, before applying the converted signal to either the first frequency converter or the second frequency converter by way of the first or the second local oscillation signal, while another signal thereof is directly applied to the another one of the first frequency converter or the second frequency converter, which is remaining one described-above by way of the first or the second local oscillation signal.

In the above conventional double superheterodyne scheme of FIG. 1, it is necessary to arrange strict shielding, because the intermediate signal which is frequency-converted at the side of reception by the local frequency for the first frequency-conversion interferes with the transmission-intermediate frequency signal, and the signal which is frequency-converted at the side of reception by the second local frequency interferes with the reception-second local frequency. Furthermore, in the conventional double superheterodyne scheme it becomes necessary to prepare four oscillators.

Moreover, in the conventional double superheterodyne receiver of the Japanese Patent Application Laid-Open No. SHO 63-9320, there are problems that it is difficult to reduce spurious caused by employing multiplier, and that it is difficult to change channels.

SUMMARY OF THE INVENTION

In view of the foregoing, it is an object of the present invention to provide a radio transmitter-receiver in which even if a frequency configuration is double-super scheme, miniaturization of apparatus is capable of performing, and even if shielding is simplified, interference on the inside of the circuit is capable of being avoided with the minimum, thus reducing the number of oscillators to the utmost.

According to one aspect of the present invention, for achieving the above-mentioned object, there is provided a radio transmitter-receiver for employing both of a transmission/reception common-frequency and a double superheterodyne scheme, comprising a side of transmission in which a single frequency conversion is performed, and a side of reception in which a double frequency conversion is performed.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 3 is a block diagram showing an embodiment of the present invention;

FIG. 5 is a view showing a relationship of a frequency configuration between the present invention and the prior art example.

DETAILED DESCRIPTION OF THE PREFERRED EMBODIMENTS

Figure 1:
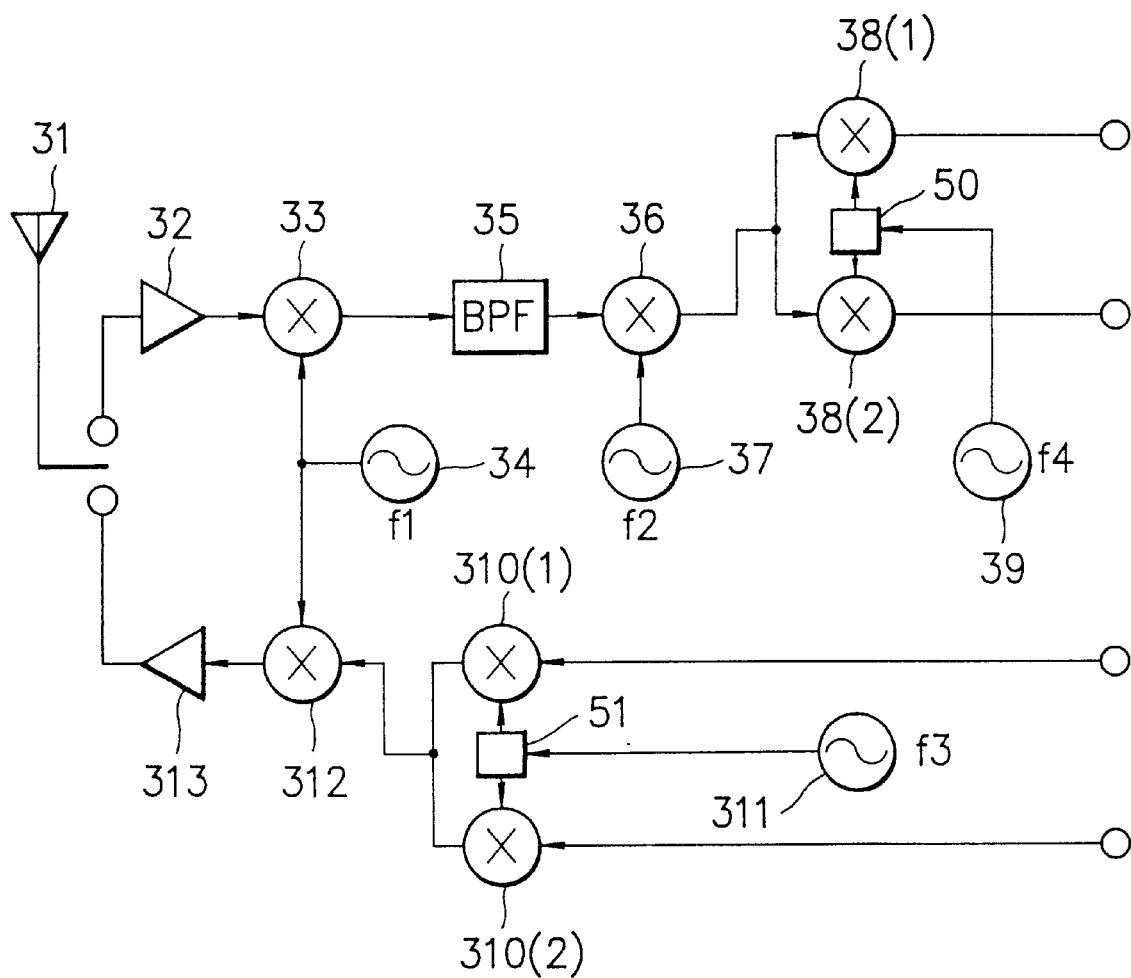
FIG. 1 is a block diagram showing a convectional double superheterodyne scheme.
Figure 2:
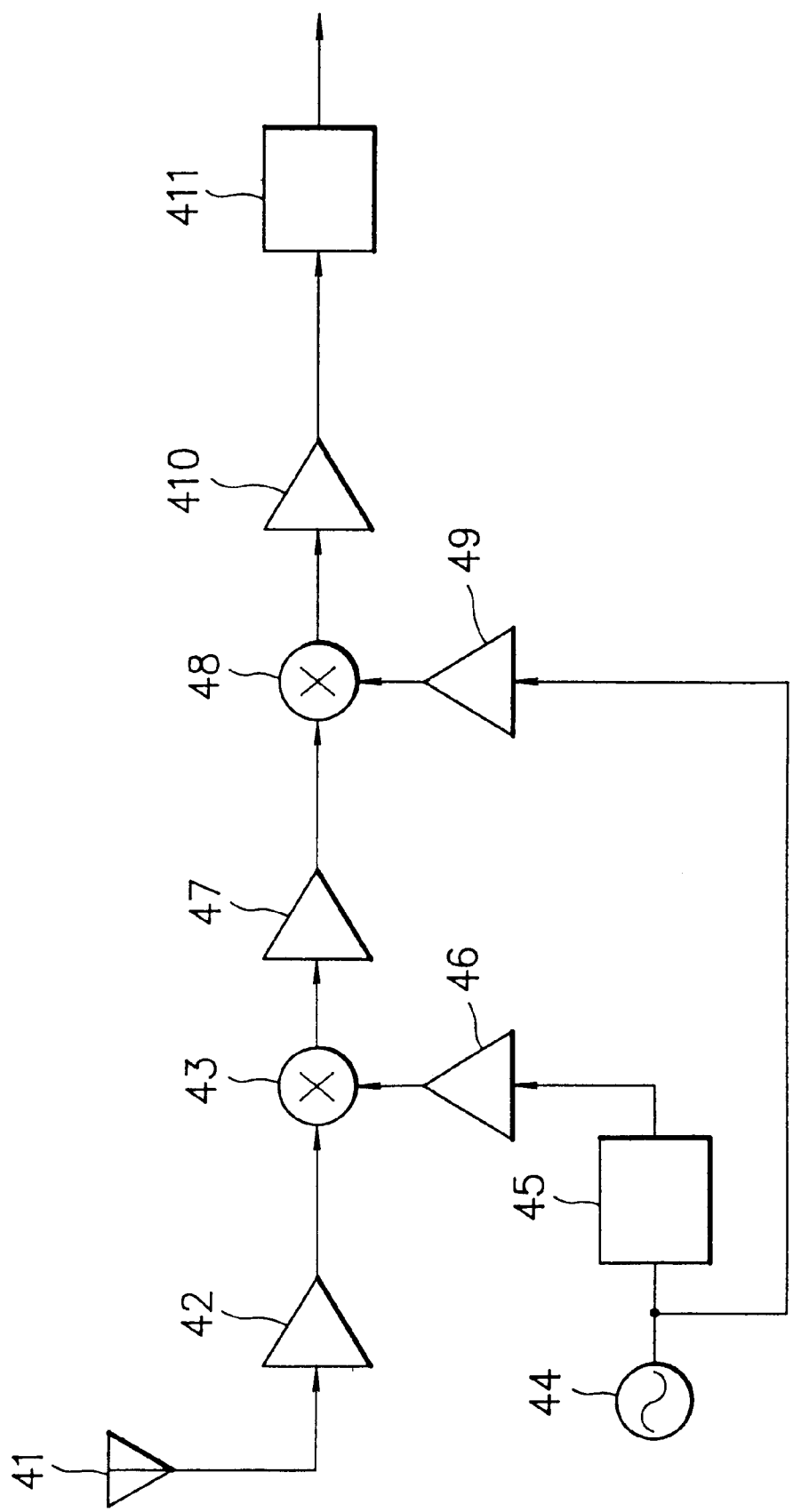
FIG. 2 is a block diagram showing a second conventional double superheterodyne scheme.

A preferred embodiment of the present invention will now be described in detail referring to FIG. 3.

FIG. 3 is a block diagram showing a block structure of an embodiment of a radio transmitter/receiver according to the present invention. According to FIG. 3, a radio transmitter/receiver of this embodiment is composed both of a reception side and a transmission side.

The reception side comprises an antenna 1 for transmitting/receiving a radio wave, an amplifier 2 for amplifying a signal received by the antenna 1, a first frequency converter 3 for converting an output of the amplifier 2 into a first intermediate frequency signal, a first local oscillator 4 whose oscillation signal is inputted to the first frequency converter 3, a band pass filter 5 which allows only required bandwidth of an output of the first frequency converter to pass, a second frequency converter 6 for converting the output of the band pass filter 5 into a second intermediate frequency signal, a second local oscillator 7 for generating two times the frequency signal which is inputted to the second frequency converter 6, a frequency divider 8 for converting the frequency of the second local oscillator 7 into ½ times the frequency thereof, third frequency converters 9(1) and 9(2) for converting the output of the second frequency converter into a base band signal, a frequency divider 10 for frequency-dividing into a signal which is inputted to the third frequency converters 9(1) and 9(2), a phase shifter 20 which provides the output of the frequency divider 10 as intact for the third frequency converter 9(1) and which provides a signal created in such a way that the output of the frequency divider is phase-shifted by $\pi/2$ for the third frequency converter 9(2), and a frequency converter 11 for generating a signal to be inputted to the frequency divider 10 using both of the frequency of the second local oscillator 7 and the transmission-intermediate frequency signal.

The transmission side comprises transmission-second frequency converters 12(1) and 12(2) for converting a base band signal to be transmitted into the transmission-intermediate frequency signal, an oscillator 13 for generating two times the frequency signal of the transmission-intermediate frequency signal, a frequency divider 14 for converting the frequency of the oscillator 13 into ½ times the frequency signal thereof, a phase shifter 21 which provides the output of the frequency divider 14 as intact for the transmission-second frequency converter 12(1) and provides the signal which is created in such a way that the output of the frequency divider 14 is phase-shifted by $\pi/2$ for the transmission second frequency converter 12(2), a frequency converter 15 for converting the signal thereof up to a radio-frequency signal, and an amplifier 16 causing signals for transmission to amplify up to a level in which the signal is converted into a radio wave by the antenna 31 for outputting.

In the present invention, a single-frequency conversion scheme is adopted at the transmission side and a double-frequency conversion scheme is adopted at the reception side. The transmission-frequency is identical with the reception-frequency. The common oscillator 4 of an oscillation frequency f1 is employed for a local frequency for transmission/reception-first frequency conversion. A reception second local frequency signal and a transmitter intermediate frequency signal are generated by independent oscillators 7 and 13 with oscillation frequencies of 2f2 and 2f3 respectively. These oscillators 7 and 13 generate two times the frequency of the conventional example, thus providing the signals with ½ times the frequency signal by the frequency divider 8 and 14 for the reception side second frequency converter 6 and transmission side intermediate frequency converters 12(1) and 12(2) respectively. The output signals of these two oscillators are mixed in the frequency converter 11 before the output signals are divided into ½-times the frequency thereof by the frequency divider 10, thus generating a base band signal of (2f2+2f3)/2 (in which "+" means mixing of signals) with the same frequency as that of the second local frequency signal.

Figure 4:
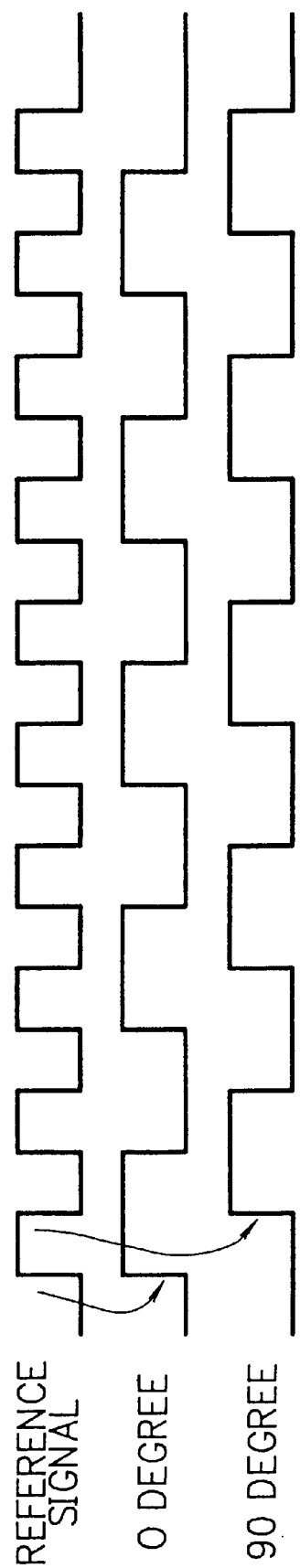
FIG. 4 is a view showing a reason why orthogonal phase-signal can easily be obtained.

In this constitution, during reception of the signals, it allows the operation of the frequency divider 14 for a transmitter intermediate frequency signal to halt temporarily. For this reason, since interference to the intermediate frequency band on the side of reception vanishes therefrom, it becomes unnecessary to shield the reception side and the transmission side from each other. Furthermore, in regard to the other frequency, the converter, the demodulator, or the modulator can incorporate the frequency divider therein, because they can be constituted using the integrated circuits, with the result that the other frequency and the frequency of each oscillator become different from each other, so that interference therebetween is capable of decreasing. Also the number of oscillator is capable of decreasing. Since two times the frequency can be obtained using the frequency divider, there is a merit to easily obtain the orthogonal phase signal. This is the reason why, as shown in FIG. 4, the signal whose phase is shifted by 90° is capable of being created easily due to both of a leading edge and a trailing edge of the reference signal.

FIG. 5 shows a table tabulated of the relationship for the frequency configuration between the above conventional example and the present invention.

In stead of the amplifiers 2, and 16, any equipment is permitted if there has a performance which can increase gain of a signal. Furthermore, in accordance with the necessity, in stead of the band pass filter 5 another filter might be used.

According to the embodiment, the frequency dividers 8, 10, and 14 are described above with ½ times the frequency division of the signals. Such as i.e. ¼ times the frequency division and so forth, different ratio thereof might be permitted when whole frequency configuration is matched. However it might be desired that 2 of 1/N-th-exponentiations (i,e, $½^N$) should be adopted as the coefficient of the frequency division.

With regard to the frequency signal which necessitates the orthogonal phase relation, the transmitter intermediate frequency signal, or the reception second intermediate frequency signal, also both of which necessitate the orthogonal phase relation, when the frequency divider with 2 of 1/N-the exponentiations ($½^N$) disclosed in the embodiment is employed, 2-times the frequency thereof is capable of obtaining, so that the orthogonal phase signal can easily be obtained.

As described above, in the radio transmission system employing the transmission/reception common-frequency according to the present invention, the frequency relation is constituted by only three oscillators, and that since the oscillation frequency of each oscillator is different from the reception intermediate frequency, interference to the intermediate stage is capable of reducing.

While preferred embodiments of the invention have been described using specific terms, such description is for illustrative purposes only, and it is to be understood that changes and variations may be made without departing from the spirit or scope of the following claims.

What is claimed is:

1. A radio transmitter-receiver for adopting both of a common-frequency for transmission/reception of signals and a double superheterodyne scheme comprising:

a transmission side in which a single frequency conversion is implemented; and a reception side in which a double frequency conversion is implemented;

said transmission side including:

a transmission side first frequency converter converting a transmission base band signal into a transmitter intermediate frequency signal using a transmission side first local signal;

a transmission side oscillator generating a signal with N times the frequency of said first local signal;

a transmission side frequency divider which divides an output of said transmission side oscillator into 1/N times frequency thereof, thus generating said transmission side first local signal;

a transmission side second frequency divider which converts said transmitter intermediate frequency signal into a signal of said transmission/reception-common frequency, thus providing said signal of said transmission/reception-common frequency for an antenna using a transmission/reception-shared local signal; and a transmission/reception-combination oscillator generating said transmission/reception-shared local signal, and said reception side including:

a reception side first frequency converter converting the signal received by said antenna into a reception side first intermediate frequency signal using said transmission/reception-shared local signal;

a band pass filter allowing the required bandwidth of said reception side first intermediate frequency signal to pass;

a reception side second frequency converter converting the output of said band pass filter into a reception side second intermediate frequency signal using a reception side first local signal;

a reception side oscillator generating a signal with N times the frequency signal of said reception side first local signal;

a reception side frequency divider dividing the output of said reception side oscillator into 1/N times the frequency signal thereof, before generating said reception side first local signal;

means for mixing the output of said reception side oscillator with the output of said transmission side oscillator, before generating a signal with a frequency corresponding to 1/N times the frequency of sum of the both frequencies thereof as a reception side second local signal; and means for converting said reception side second intermediate frequency signal into a reception base band signal using said reception side second local signal.

2. A radio transmitter-receiver according to claim 1, further comprising means for halting the operation of said transmission side frequency divider during reception of signals.

3. A radio transmitter-receiver according to claim 2, wherein said N is 2.

4. A radio transmitter-receiver according to claim 3, wherein the frequency dividers are incorporated in the converter, a demodulator, or a modulator due to adoption of an integrated circuit.

5. A radio transmitter-receiver according to claim 4, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the transmission side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

6. A radio transmitter-receiver according to claim 2, wherein the frequency delvers are incorporated in the converter, a demodulator, or a modulator due to adoption of an integrated circuit.

7. A radio transmitter-receiver according to claim 6, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the transmission side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

8. A radio transmitter-receiver according to claim 2, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the transmission side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

9. A radio transmitter-receiver according to claim 1, wherein said N is 2.

10. A radio transmitter-receiver according to claim 9, wherein the the frequency dividers are incorporated in the converter, a demodulator, or a modulator due to adoption of an integrated circuit.

11. A radio transmitter-receiver according to claim 10, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the transmission side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

12. A radio transmitter-receiver according to claim 9, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the transmission side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

13. A radio transmitter-receiver according to claim 1, wherein the frequency dividers are incorporated in the converter, a demodulator, or a modulator due to adoption of an integrated circuit.

14. A radio transmitter-receiver according to claim 13, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the transmission side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

15. A radio transmitter-receiver according to claim 3, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the transmission side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

16. A radio transmitter-receiver according to claim 1, wherein a frequency for transmission is identical with that for reception, an oscillation frequency f1 of the common oscillator is employed for a local frequency for transmission/reception-first frequency conversion, an oscillation frequency 2f2 of the reception side second local frequency signal is generated by the reception side oscillator, an oscillation frequency 2f3 of the transmission side intermediate frequency signal is generated by the reception side oscillator, thus providing the signals with frequency of ½ times-division by the frequency dividers for the reception side second frequency converter and the transmission side intermediate frequency converters respectively, and the output signals of these two oscillators are mixed in the frequency converter before the output signals are divided into ½-times the frequency thereof by the frequency divider, thus generating a base band signal (2f2+2f3)/2 (in which "+" means mixing of signals) with the same frequency as that of the second local frequency signal.

17. A method of transmission/reception for a transmitter-receiver for adopting both of a common-frequency for a transmission/reception of signals and a double superheterodyne method comprising the steps of:

performing single frequency conversion at a transmission side; and performing double frequency conversion at a reception side;

said transmission side including the steps of:
    converting a transmission base band signal into a transmitter intermediate frequency signal using a transmission side first local signal by a transmission side first frequency converter;
    generating a signal with N times the frequency of said first local signal by a transmission side oscillator;
    dividing an output of said transmission side oscillator into 1/N times frequency thereof by a transmission side frequency divider, thus generating said transmission side first local signal;
    converting said transmitter intermediate frequency signal into a signal of said transmission/reception common-frequency by a transmission side second frequency divider, thus providing said signal of said transmission/reception common-frequency for an antenna using a transmission/reception shared local signal; and
    generating said transmission/reception shared local signal by a transmission/reception-combination oscillator, and said reception side comprising the steps of:
- converting the signal received by said antenna into a reception side first intermediate frequency signal using said transmission/reception shared local signal by a reception side first frequency converter;
- allowing the required bandwidth of said reception side first intermediate frequency signal to pass by a band pass filter;
- converting the output of said band pass filter into a reception side second intermediate frequency signal using a reception side first local signal by a reception side second frequency converter;
- generating a signal with N times the frequency signal of said reception side first local signal by a reception side oscillator;
- dividing the output of said reception side oscillator, before generating said reception side first local signal by a reception side frequency divider;
- mixing the output of said reception side oscillator with the output of said transmission side oscillator, before generating a signal with a frequency corresponding to 1/N times the frequency of sum of both frequencies thereof as a reception side second local signal; and
- converting said reception side second intermediate frequency signal into a reception-base band signal using said reception side second local signal.

18. A method of transmission/reception for a radio transmitter-receiver according to claim 17, further comprising the step of halting the operation of said transmission side frequency divider during reception of signals.

19. A method of transmission/reception for a radio transmitter-receiver according to claim 18, wherein said N is 2.

* * * * *